US009728206B2

(12) United States Patent
Gao et al.

(10) Patent No.: US 9,728,206 B2
(45) Date of Patent: *Aug. 8, 2017

(54) INTERLACED MAGNETIC RECORDING (71) Applicant: Seagate Technology LLC, Cupertino, CA (US)

(72) Inventors: Kaizhong Gao, North Oaks, MN (US); Wenzhong Zhu, Apple Valley, MN (US); Edward Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,561

(22) Filed: Apr. 14, 2015

(65) Prior Publication Data

US 2016/0148642 A1 May 26, 2016

Related U.S. Application Data (60) Provisional application No. 62/083,696, filed on Nov. 24, 2014, provisional application No. 62/083,732, filed on Nov. 24, 2014.

(51) Int. Cl.
G11B 5/09 (2006.01)
G11B 5/012 (2006.01)
G11B 20/18 (2006.01)
G11B 11/105 (2006.01)
G11B 5/00 (2006.01)
(Continued)

(52) U.S. Cl.
CPC .............. *G11B 5/09* (2013.01); *G11B 5/012* (2013.01); *G11B 20/1217* (2013.01); *G11B 20/1833* (2013.01); *G11B 5/59633* (2013.01); *G11B 5/59638* (2013.01); *G11B 11/10506* (2013.01); *G11B 11/10515* (2013.01); *G11B 11/10521* (2013.01); *G11B 11/10595* (2013.01); *G11B 20/12* (2013.01); *G11B 2005/0021* (2013.01); *G11B 2020/1222* (2013.01); *G11B 2020/1238* (2013.01)

(58) Field of Classification Search
None
See application file for complete search history.

(56) References Cited

U.S. PATENT DOCUMENTS 4,030,130 A 6/1977 Smith
4,152,736 A 5/1979 Jansen et al.
(Continued)

FOREIGN PATENT DOCUMENTS

EP 0484774 A2 5/1992
EP 1564736 8/2005
(Continued)

*Primary Examiner* — K. Wong
(74) *Attorney, Agent, or Firm* — Holzer Patel Drennan (57) ABSTRACT A storage device includes a transducer head including a first write element configured to write data at a first write width and a second write element configured to write data at a second write width less than the first write width. According to one implementation, the first write element writes data at a first linear density and to alternating data tracks and the second write element writes data at a second linear density and to data tracks interlaced with the alternating data tracks.

17 Claims, 7 Drawing Sheets (51) Int. Cl.
*G11B 20/12* (2006.01)
*G11B 5/596* (2006.01)

(56) References Cited

U.S. PATENT DOCUMENTS

| | | | |
|---|---|---|---|
| 4,298,897 A * | 11/1981 | Arter | G11B 5/00808 360/39 |
| 4,535,372 A | 8/1985 | Yeakley | |
| 4,622,601 A * | 11/1986 | Isozaki | G11B 5/016 360/118 |
| 4,646,168 A | 2/1987 | Sonobe et al. | |
| 4,771,346 A * | 9/1988 | Shoji | G11B 5/86 360/15 |
| 4,803,571 A | 2/1989 | Fujioka et al. | |
| 4,853,799 A * | 8/1989 | Aikawa | G11B 5/012 360/48 |
| 5,010,430 A * | 4/1991 | Yamada | G11B 5/4886 360/235.4 |
| 5,285,341 A | 2/1994 | Suzuki et al. | |
| 5,402,270 A | 3/1995 | McDonnell et al. | |
| 5,760,993 A | 6/1998 | Purkett | |
| 5,892,634 A | 4/1999 | Ito et al. | |
| 5,978,168 A | 11/1999 | Mathews et al. | |
| 6,052,797 A | 4/2000 | Ofek et al. | |
| 6,104,562 A | 8/2000 | Ottesen et al. | |
| 6,185,063 B1 * | 2/2001 | Cameron | G11B 5/5552 360/75 |
| 6,710,960 B1 * | 3/2004 | Yorimitsu | G11B 19/128 360/69 |
| 6,768,605 B2 * | 7/2004 | Yamamoto | G11B 5/4886 360/69 |
| 7,130,152 B1 | 10/2006 | Raymond et al. | |
| 7,259,927 B2 | 8/2007 | Harris | |
| 7,393,066 B2 | 7/2008 | Dugas et al. | |
| 7,440,222 B2 | 10/2008 | Nakamura et al. | |
| 7,508,619 B2 | 3/2009 | Okamoto et al. | |
| 7,573,682 B2 | 8/2009 | Pust et al. | |
| 7,822,829 B2 | 1/2011 | Sakai | |
| 7,907,360 B2 | 3/2011 | Mak et al. | |
| 7,957,093 B2 | 6/2011 | Brand | |
| 7,965,465 B2 | 6/2011 | Sanvido et al. | |
| 8,023,215 B1 | 9/2011 | Ghaly et al. | |
| 8,139,318 B2 | 3/2012 | Biskeborn | |
| 8,310,777 B2 | 11/2012 | Biskeborn et al. | |
| 8,310,782 B2 | 11/2012 | Song et al. | |
| 8,531,792 B1 | 9/2013 | Burd et al. | |
| 8,531,793 B2 | 9/2013 | Bandic et al. | |
| 8,537,481 B1 | 9/2013 | Bandic | |
| 8,599,510 B1 | 12/2013 | Fallone | |
| 8,693,123 B1 | 4/2014 | Guo et al. | |
| 8,699,159 B1 | 4/2014 | Malina | |
| 8,699,162 B1 | 4/2014 | Grobis et al. | |
| 8,711,517 B2 | 4/2014 | Erden et al. | |
| 8,854,752 B2 | 10/2014 | Jin et al. | |
| 8,867,161 B2 | 10/2014 | Emo et al. | |
| 8,873,178 B2 * | 10/2014 | Erden | G11B 20/1217 360/39 |
| 8,913,335 B2 | 12/2014 | Coker et al. | |
| 8,917,469 B1 | 12/2014 | Guo et al. | |
| 8,929,186 B1 | 1/2015 | Sharma et al. | |
| 8,976,478 B1 | 3/2015 | Harllee, III et al. | |
| 9,053,712 B1 | 6/2015 | Guo et al. | |
| 9,058,829 B1 | 6/2015 | Wolf et al. | |
| 9,082,458 B1 | 7/2015 | Tang | |
| 9,087,541 B1 | 7/2015 | Pokharel et al. | |
| 9,099,103 B1 | 8/2015 | Krichevsky | |
| 9,105,302 B1 | 8/2015 | Erden et al. | |
| 9,111,575 B1 | 8/2015 | Zhou et al. | |
| 9,111,578 B1 | 8/2015 | Hassel et al. | |
| 9,129,658 B1 | 9/2015 | Yamamoto | |
| 9,142,232 B2 | 9/2015 | Edelman et al. | |
| 9,142,246 B1 | 9/2015 | Trantham et al. | |
| 9,153,287 B1 | 10/2015 | Hamilton et al. | |
| 9,324,362 B1 | 4/2016 | Gao | |
| 9,396,062 B1 | 7/2016 | Sridhara et al. | |
| 9,418,688 B1 | 8/2016 | Rausch et al. | |
| 9,508,362 B2 * | 11/2016 | Gao | G11B 5/09 |
| 2002/0035666 A1 | 3/2002 | Beardsley et al. | |
| 2002/0035704 A1 | 3/2002 | Wilson | |
| 2002/0105867 A1 | 8/2002 | Tamaru et al. | |
| 2003/0214886 A1 | 11/2003 | Sakamoto et al. | |
| 2005/0078399 A1 | 4/2005 | Fung et al. | |
| 2005/0157597 A1 | 7/2005 | Sendur et al. | |
| 2006/0215511 A1 | 9/2006 | Shin et al. | |
| 2007/0047415 A1 | 3/2007 | Chang | |
| 2007/0050593 A1 | 3/2007 | Chen et al. | |
| 2007/0174582 A1 | 7/2007 | Feldman | |
| 2008/0002272 A1 | 1/2008 | Riedel | |
| 2008/0239901 A1 | 10/2008 | Tsunokawa et al. | |
| 2008/0316639 A1 | 12/2008 | Tang et al. | |
| 2009/0244775 A1 | 10/2009 | Ehrlich | |
| 2009/0251821 A1 | 10/2009 | Song et al. | |
| 2010/0014183 A1 | 1/2010 | Aoki et al. | |
| 2010/0027406 A1 | 2/2010 | Krause et al. | |
| 2010/0271727 A1 | 10/2010 | Namkoong et al. | |
| 2010/0321817 A1 | 12/2010 | Aida et al. | |
| 2012/0014013 A1 | 1/2012 | Bandic et al. | |
| 2012/0194946 A1 | 8/2012 | Watanabe et al. | |
| 2013/0148225 A1 | 6/2013 | Coker et al. | |
| 2013/0155826 A1 | 6/2013 | Zhang et al. | |
| 2013/0294207 A1 | 11/2013 | Erden et al. | |
| 2014/0016224 A1 | 1/2014 | Unoki et al. | |
| 2014/0043708 A1 | 2/2014 | Erden et al. | |
| 2014/0055881 A1 | 2/2014 | Zaharris | |
| 2014/0153134 A1 | 6/2014 | Han et al. | |
| 2014/0160589 A1 | 6/2014 | Deki et al. | |
| 2014/0285923 A1 | 9/2014 | Aoki | |
| 2014/0327983 A1 | 11/2014 | Biskeborn et al. | |
| 2015/0178161 A1 | 6/2015 | Burd et al. | |
| 2016/0148630 A1 | 5/2016 | Rausch | |
| 2016/0148635 A1 | 5/2016 | Zhu et al. | |
| 2016/0148636 A1 | 5/2016 | Ma et al. | |
| 2016/0148637 A1 | 5/2016 | Rausch et al. | |
| 2016/0148642 A1 | 5/2016 | Gao | |
| 2016/0148643 A1 | 5/2016 | Gao et al. | |
| 2016/0148644 A1 | 5/2016 | Zhu et al. | |
| 2016/0148645 A1 | 5/2016 | Zhu et al. | |

FOREIGN PATENT DOCUMENTS

| | | |
|---|---|---|
| JP | 02240862 A | 9/1990 |
| WO | 2005-030869 A1 | 4/2005 |

* cited by examiner

INTERLACED MAGNETIC RECORDING

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014. Both of these applications are specifically incorporated by reference for all that they disclose or teach.

BACKGROUND

As requirements for data storage density increase for magnetic media, cell size decreases. A commensurate decrease in the size of a write element is difficult because in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is shingled magnetic recording (SMR).

SMR allows for increased areal density capability (ADC) as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks.

Therefore, better designs are desired to increase storage device performance while achieving or improving upon the ADC of existing SMR systems.

SUMMARY

Implementations disclosed herein provide for a transducer head including a first write element configured to write data at a first write width and a second write element configured to write data at a second write width less than the first write width.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
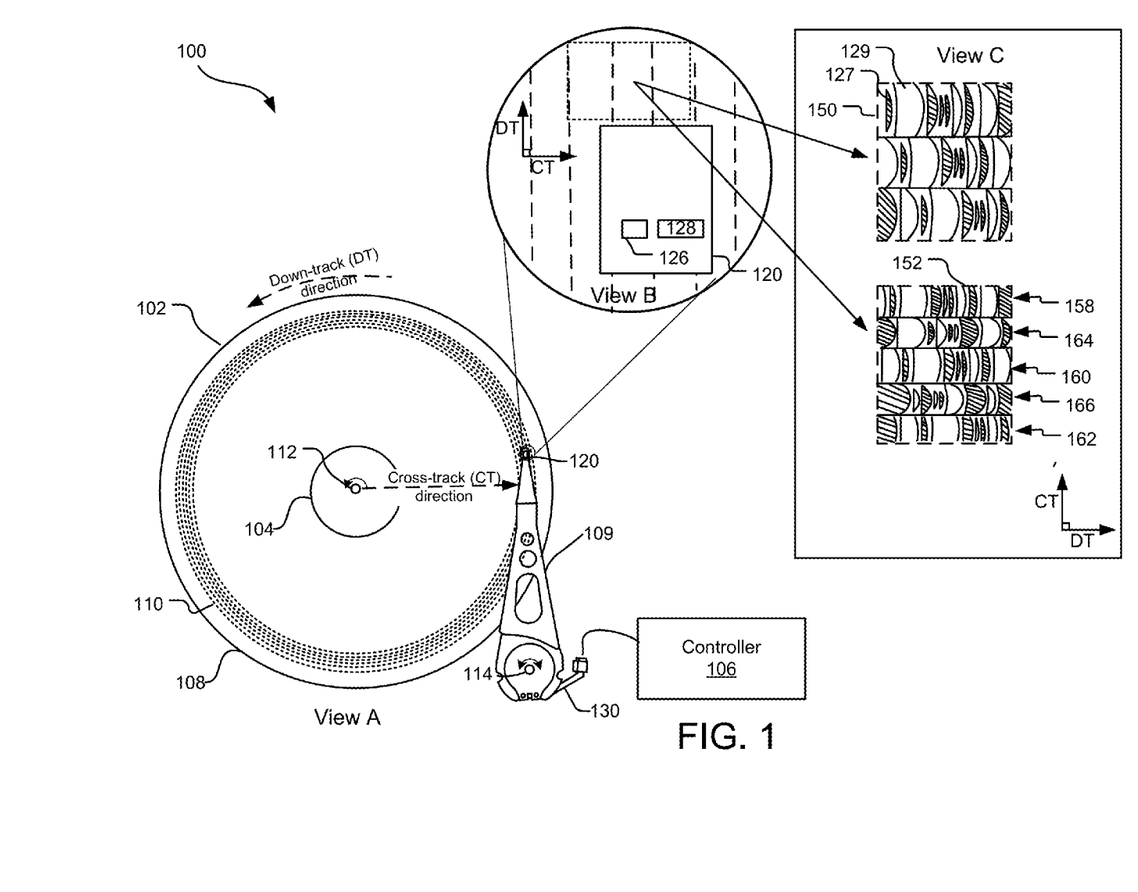
FIG. 1 illustrates a data storage device including a transducer head assembly for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (e.g., a write pole 130) and from which data bits can be read using a magnetoresistive element (not shown). As illustrated in View A, the storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 114. The transducer head assembly 120 flies in close proximity above the surface of the storage medium 108 during disc rotation. The actuator assembly 109 rotates during a seek operation about the actuator axis of rotation 112. The seek operation positions the transducer head assembly 120 over a target data track for read and write operations.

Referring to View B, the transducer head assembly 120 includes two different write elements 126 and 128. The write elements 126 and 128 are shown to be in alignment in the cross-track direction; however, other write element configurations are contemplated for use in other implementations. Each of the write elements 126 and 128 includes a write pole (not shown) that converts a series of electrical pulses sent from a controller 106 into a series of magnetic pulses of commensurate magnitude and length, and the magnetic pulses selectively magnetize magnetic grains of the rotating magnetic media 108 as they pass below the pulsating write element 126 or 128.

View C illustrates magnified views 150 and 152 of a same surface portion of the storage media 108 according to different write methodologies and settings of the storage device 100. Specifically, the magnified views 150 and 152 include a number of magnetically polarized regions, also referred to herein as "data bits," along the data tracks of the storage media 108. Each of the data bits (e.g., a data bit 127) represents one or more individual data bits of a same state (e.g., 1s or 0s). For example, the data bit 129 is a magnetically polarized region representing multiple bits of a first state (e.g., "000"), while the adjacent data bit 127 is an oppositely polarized region representing one or more bits of a second state (e.g., a single "1"). The data bits in each of the magnified views 150, 152 are not necessarily illustrative of the actual shapes or separations of the bits within an individual system configuration.

The magnified view 150 illustrates magnetic transitions recorded according to a conventional magnetic recording (CMR) technique. In a CMR system, all written data tracks are randomly writeable and of substantially equal width. As used herein, a random write refers to a write operation to a first data track that does not critically impair (e.g., corrupt or erase) data on either adjacent track. According to one implementation, the recorded data bits of the magnified view 150 are recorded with a same write element (e.g., either the write element 126 or 128) of the storage device 100.

In a CMR system, an achievable linear density (e.g., density along an individual data track) is limited by the size of the write element used to write the data encoded on the storage medium 108. For example, the data bit 127 may represent the smallest data bit recordable by a particular write element. Likewise, a read element (not shown) may have difficulty deciphering the data recorded on the media 108 if the various polarized regions are too small or placed too close to one another.

In some implementations, linear density is increased at the expense of track density (ktpi). For example, an acceptable bit error rate (BER) may be maintained while increasing linear density (kbpi) of each data track so long as the width of the data tracks is also uniformly increased. However, widening data tracks decreases the overall areal density capability (ADC), (e.g., the product between linear density and track density) of the storage media 108.

The magnified view 152 illustrates data bits recorded according to another set of system parameters implementing an interlaced magnetic recording (IMR) technique. According to one implementation, this IMR technique provides for a higher total areal density capability (ADC) with a lower observable BER than conventional recording systems.

Specifically, the magnified view 152 illustrates alternating data tracks of different track widths and different linear densities. The write element 128 is used to write a first grouping of alternating data tracks (e.g., data tracks 158, 160, and 162) with a wide written track width, while the write element 126 is used to write a second grouping of interlaced data tracks (e.g., the data tracks 164, 166) with a narrower written track width. Data of the narrow, interlaced data tracks overwrites edges of adjacent and previously written data tracks of the wider width. For example, the write of the data track 164 overwrites data on the adjacent edges of the data tracks 164 and 166. In other words, a defined track pitch (e.g., radial spacing between centers of two directly adjacent data tracks) is by design less than the write width of the write element 128 but greater than or approximately equal to the write width of the write element 126.

In another implementation, the first grouping of data tracks (e.g., the data tracks 158, 160, and 162) includes data of a higher linear density than the interlaced tracks (e.g., the data tracks 164 and 166). Other implementations of the disclosed technology may provide for data tracks of three or more different written track widths and/or three or more different linear densities on a same surface of the magnetic storage medium 108.

To generate the IMR pattern shown in magnified view 152, a storage controller 106 of the storage device 100 alters one or more system parameters (e.g., write current, overshoot, waveform, etc.) based on a discrete write location where data is received and stored on the storage medium 108. For example, the storage controller 106 may write even-numbered data tracks on the storage medium 108 with a first linear density and track width and write odd-numbered data tracks on the magnetic media with a second linear density and different track width.

In at least one implementation, the storage medium 108 is divided radially into zones and each zone is associated with multiple linear densities. For example, two different linear densities may be used to write data of alternating tracks within each individual radial zone. The linear densities used in one radial zone may differ from the linear densities used in any other radial zone of the storage medium 108.

Further, the controller 106 may be configured to systematically direct incoming write commands to different data tracks of the storage medium according to a number of prioritized random access (PRA) rules. For example, the controller 106 selects storage locations for each incoming write command to systematically maximize a total number of possible random writes.

The controller 106 includes software and/or hardware, and may be implemented in any tangible computer-readable storage media within or communicatively coupled to the storage device 100. The term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Figure 2:
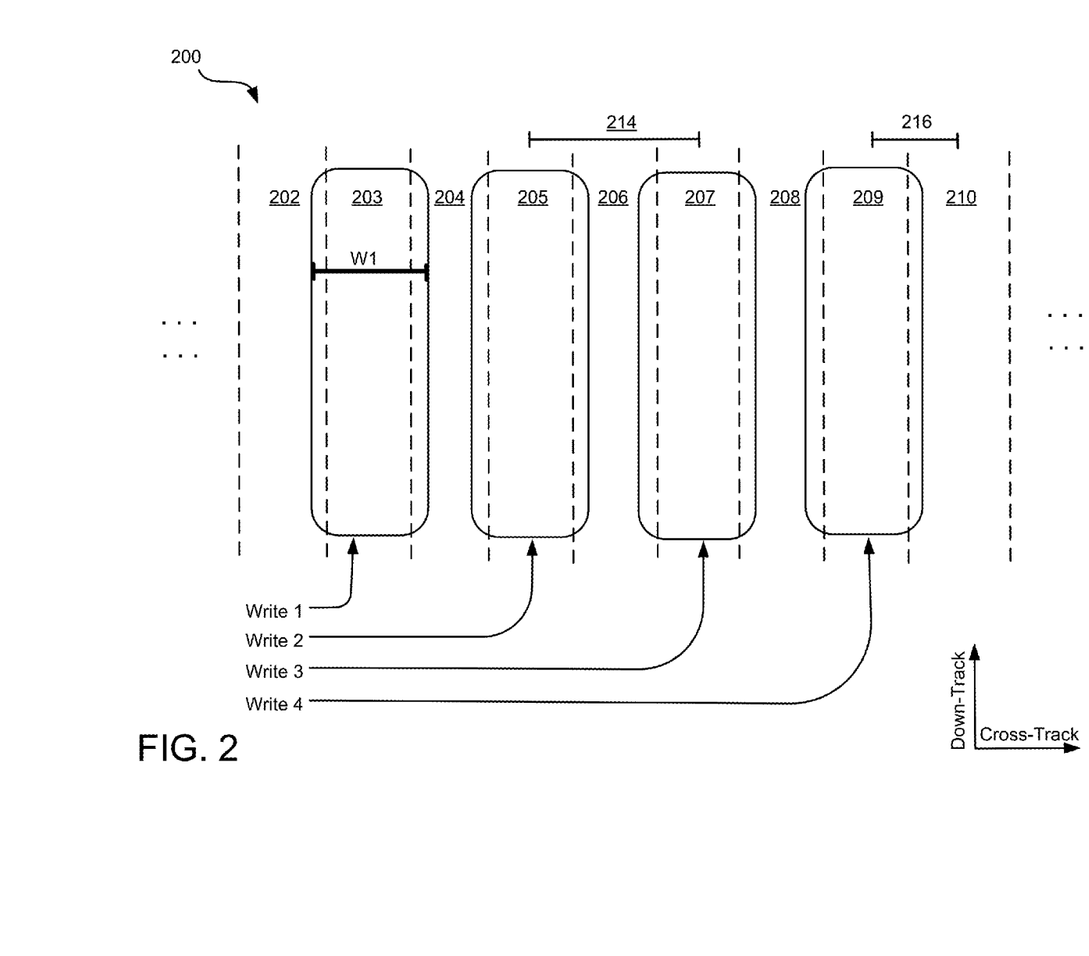
FIG. 2 illustrates example data writes in a storage drive employing an interlaced magnetic recording (IMR) technique.

FIG. 2 illustrates example data writes in magnetic disc 200 employing an IMR technique. The magnetic disc 200 includes a number of substantially circular data tracks (e.g., data tracks 202-210). A controller (not shown) selects data tracks to receive and store incoming data. For each write operation, the controller identifies relevant PRA rules and executes the write operation in a manner that satisfies the relevant PRA rules.

In general, PRA rules dictate an order in which two or more data tracks on the magnetic disc 200 are to be written. For example, a PRA rule may specify that the data track 203 is to be written before either of the adjacent data tracks 202 or 204. In this case, the data track 203 is randomly writable if the data tracks 202 and 204 do not contain any data. If however, data is already stored on either of the data tracks 202 and 204, the data write to the data track 203 may include: (1) caching the data on the data tracks 202 and/or 204; (2) writing the data track 203; and (3) subsequently, re-writing the data of the data tracks 202 and/or 204.

A number of other example PRA rules are described below and also with respect to other implementations. These example PRA rules can be optionally included or omitted in any combination from any implementation of the disclosed technology.

In FIG. 2, the dotted lines indicate boundaries between adjacent data tracks having a same track pitch 216, which represents a center-to-center distance between two adjacent data tracks having the same track pitch 216 (e.g., distance between centers of adjacent data tracks). In one implementation, a same or substantially equal track pitch is employed across an entire surface of the magnetic disc. The track pitch 216 of each data track is smaller than a written track width (W1), (e.g., an actual width of recorded data bits in the cross-track direction) for data written to the first plurality of alternating data tracks 203, 205, 207, and 209.

In various implementations, the first plurality of alternating data tracks 203, 205, 207, and 209 includes either exclusively even-numbered tracks or exclusively odd-numbered tracks. To simplify nomenclature, the first plurality of data tracks (e.g., those tracks written with a wider bit footprint) are hereinafter referred to as "odd-numbered" data tracks. It should be understood, however, that the odd-numbered tracks may, in practice, be even-numbered tracks and vice versa. In at least one implementation, the odd-numbered (e.g., wider) data tracks are written with a higher linear density than the even-numbered data tracks.

In one implementation, a storage drive employing the illustrated IMR technique includes a transducer assembly with two write elements configured to write to a same surface of the magnetic media. A larger write element writes data to the odd-numbered data tracks, while a smaller write element writes data to the even-numbered data tracks. The larger write element writes data having a written track width that is larger than the track pitch 216 (e.g., as illustrated by the written data tracks 203, 205, 207, and 209). In one implementation, the written track width of the odd-numbered data tracks is less than a spacing 214. To select an appropriate linear density for the odd-numbered data tracks, the linear density may be initially set to a highest achievable linear density and then reduced so that the on-track BER (e.g., bit error rate based on log 10) is just below a target threshold. For example, the on-track BER may be set to 0.3-0.5 decades lower than the target threshold BER.

In one implementation, a PRA rule specifies that data may not be written to any of the even-numbered data tracks (e.g., the data tracks 202, 204, 206, 208, 210) until a capacity condition is satisfied. For example, the capacity condition may be satisfied when a total capacity of data stored on the magnetic disc 200 reaches 50-65% of the total storage capacity. Alternatively, the capacity condition may be satisfied when data stored within an individual radial zone of the magnetic disc 200 reaches some percentage of the total storage capacity of that radial zone.

So long as data is written exclusively to the odd-numbered data tracks, the odd-numbered data tracks are each randomly writeable and adjacent track interference (ATI) is not a limiting concern because the even tracks do not include any data that may be overwritten or corrupted.

The notation ("write 1," "write 2," etc.) at the bottom of FIG. 2 indicates an example order in which the odd-numbered data tracks are written. In other implementations, adjacent odd-numbered data tracks are written in a different order (e.g., a non-consecutive order).

Figure 3:
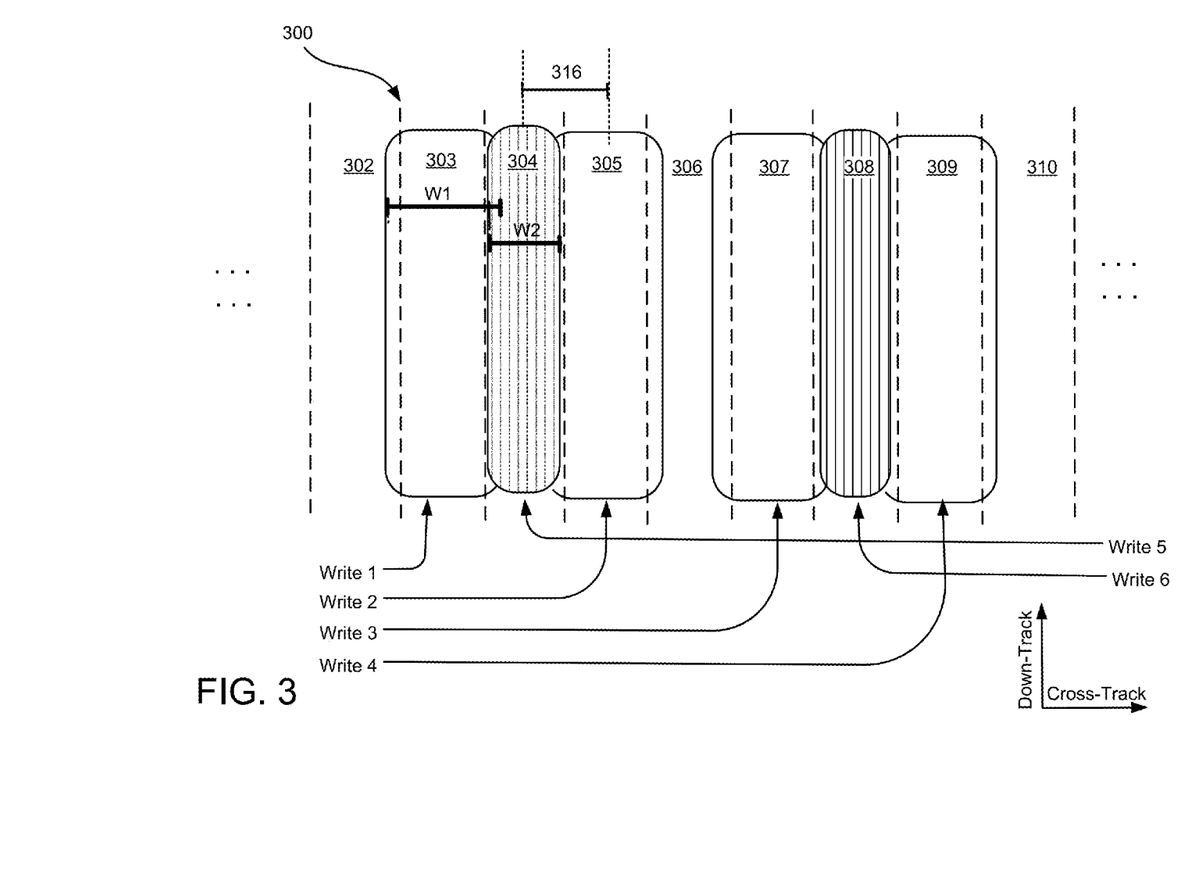
FIG. 3 illustrates other example data writes in a storage drive employing an interlaced magnetic recording technique.

FIG. 3 illustrates data writes to a magnetic disc 300 employing another IMR technique. The magnetic disc 300 includes a number of circular data tracks (e.g., data tracks 302-310). A controller (not shown) selects data tracks to receive and store incoming data. In one implementation, the controller directs the incoming data writes to odd-numbered data tracks (e.g., 303, 305, 307, and 309) so long as a capacity condition is satisfied. After the threshold capacity is reached, the controller begins to direct incoming data writes to even-numbered data tracks (e.g., 302, 304, 306).

In one implementation, data is written to the magnetic disc 300 with two different write elements differing in size so that one write element generates a stronger magnetic field than the other write element. For example, a larger write element writes data to the odd-numbered data tracks and a smaller write element writes data to the even-numbered data tracks. Consequently, data bits written to the even-numbered tracks have a written track width (W2) which is narrower than a written track width (W1) of the odd-numbered data tracks. Other systems parameters (e.g., write current, overshoot, data waveform, etc.) may be optimized to ensure a best possible linear density for the even-numbered data tracks while maintaining an acceptable SNR/BER margin, such as 0.3 decades.

In one implementation, the written track width W2 of the even-numbered data tracks is less than or approximately equal to a defined track pitch 316 (e.g., a spacing between a center of an even-numbered data track and an adjacent odd-numbered data track). In one implementation, a ratio of track width of odd-numbered data tracks to the track width of even-numbered data tracks (W1/W2) is between 1.2/1 and 2/1. In another implementation, the ratio of (W1/W2) is between 1.2/1 and 1.6/1. Other implementations are also contemplated.

In one implementation, a PRA rule specifies that data may not be written to any of the even-numbered data tracks (e.g., the data tracks 302, 304, 306) until a capacity condition is satisfied. For example, a controller of the storage device may fill all of the odd-numbered data tracks of the magnetic disc 300 with high density data of the wider track width before writing data to any even-numbered data tracks.

A data write to an even-numbered data track (e.g., the data track 304) overwrites and effectively "trims" edges of adjacent odd-numbered tracks (e.g., the data tracks 303 and 305) in narrow overlap regions where the data of the odd-numbered data track "bleeds" over the natural track boundaries. For example, a data bits of the narrow data track 304 may overwrite the right edges of data bits of the wider data track 303 and the left edges of a data bits of the wider data track 305. Even though each even-numbered data track overwrites the edge portions of adjacent odd-number data tracks, a readable portion of the data of the odd-numbered tracks is retained in the center region of each odd-numbered data track. Therefore, a bit error rate (BER) of the odd-numbered data tracks 303 and 305 may be substantially unaltered by the data write to the data track 304.

Notably, a random re-write of the data of one of the odd-numbered data tracks (e.g., the data track 303) may overwrite and substantially affect readability of data in adjacent even-numbered data tracks (e.g., the data track 302). Therefore, a data management method utilizing PRA rules is employed to ensure that groupings of adjacent data tracks are written in an order such that all data of all tracks is readable and total read/write processing time is mitigated.

According to one implementation, a data management method entails multiple phases, with different PRA rules applicable during each phase. The data management method may govern data writes to the entire magnetic disc 300, or (alternatively) govern data writes to a subset of the magnetic disc 300, such as a radial zone. In a first phase, data is written exclusively to odd-numbered data tracks at a high linear density (e.g., wide track width) (e.g., as illustrated by "write 1", "write 2", "write 3" and "write 4"). The first phase continues until a capacity condition is satisfied. For example, the capacity condition may be a threshold disc capacity (e.g., 50% of the total disc capacity) or region capacity (e.g., of a radial zone on the disc). Before the capacity condition is satisfied, each odd-numbered data track can be written to at random and directly overwritten without re-writing any data of adjacent data tracks.

After the capacity condition is satisfied, a second phase of the data management method commences. During the second phase of the data management method, data writes may be directed to even-numbered data tracks. The even-numbered data tracks are written to at a lower linear density (e.g., narrower track width). Writes to data directed exclusively to even-numbered data tracks can be performed at random (e.g., without re-writing data of any adjacent data tracks).

During this second phase of the data management method, some odd-numbered data tracks may be written to randomly and others may not. For example, the data track 303 remains randomly writeable up until the point in time when data is first written to either of adjacent data tracks 302 or 304. If an odd-numbered data track is bounded by a data track including data, the odd-numbered data track is no longer randomly writeable. For example, updating data of the data track 303 may entail caching and subsequently re-writing the data of the adjacent data tracks 302 and 304 (if 304 contains data).

In one implementation, every other even-numbered data track is left blank for a period of time while the disk continues to fill up. For example, data is initially written to tracks 304 and 308 (per "write 5" and "write 6", respectively), but no data is written to any of tracks 302, 306, or 310. So long as every-other even-numbered data track is left blank, non-random data writes entail writing no more than two data tracks at once. For example, writing data to the data track 303 entails (1) reading data tracks 303 and 302 to a temporary cache location; (2) re-writing the data track 303 with one or more updated cells; and (3) re-writing the data track 302 after the write of data track 303 is complete.

In some implementations, the data management method entails a third phase that commences once another capacity condition is satisfied. For example, the third phase may commence after all alternating even-numbered data tracks (e.g., either within a radial zone or across the surface of the disc) include data. Data writes during the third phase of PRA are further illustrated in FIG. 4.

Figure 4:
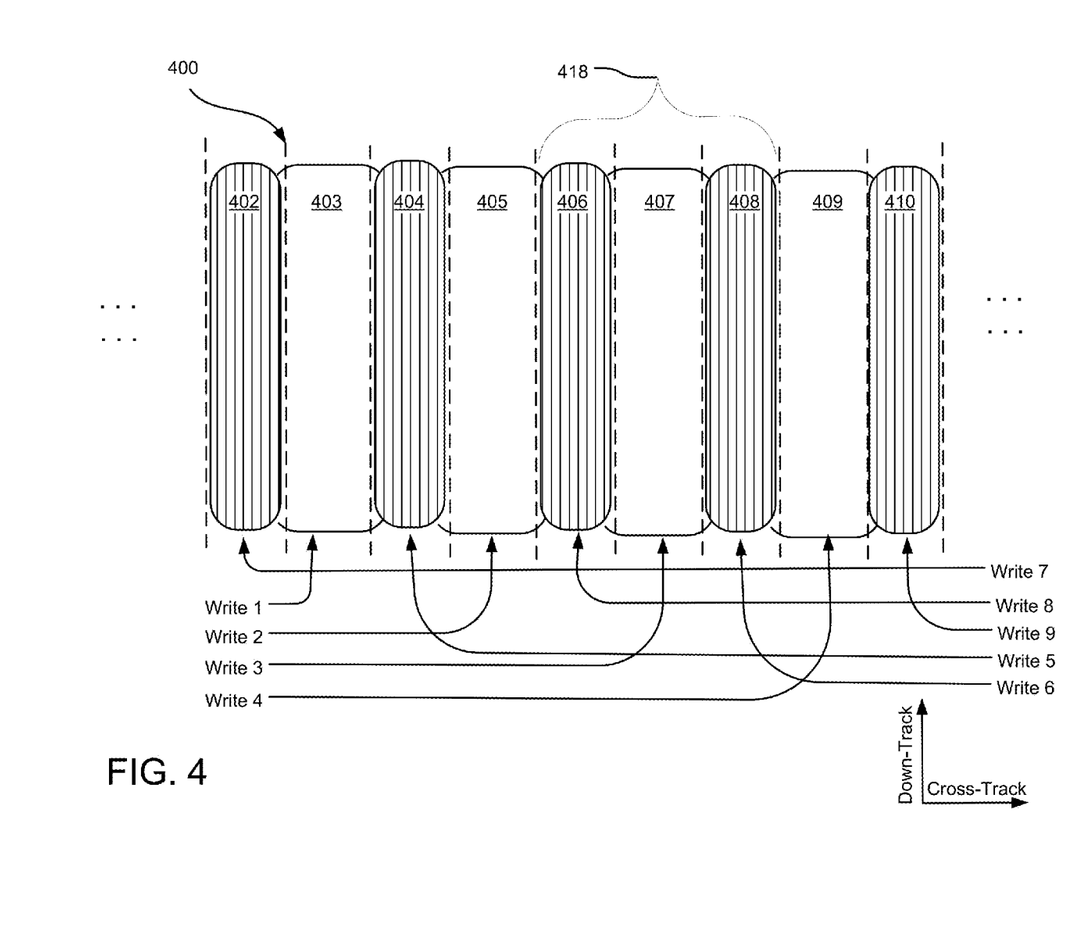
FIG. 4 illustrates still other example data writes in a storage drive employing an interlaced magnetic recording technique.

FIG. 4 illustrates example data writes 400 in a magnetic disc employing an interlaced magnetic recording technique. The magnetic disc 400 includes a number of circular data tracks (e.g., data tracks 402-410). In one implementation, a larger write element writes data to the odd-numbered data tracks and a smaller write element writes data to the even-numbered data tracks.

A controller (not shown) selects data tracks to receive and store incoming data according to a multi-phase data management method. During a first phase of the data management method, the controller directs the new incoming data to odd-numbered data tracks (e.g., via "write 1", "write 2", "write 3", and "write 4", as illustrated) until a first capacity condition is satisfied.

After the first threshold capacity is satisfied, a second phase of the data management method commences and the controller begins to direct new incoming data to every other even-numbered data track (e.g., via "write 5" and "write 6," as shown). After a second capacity condition is satisfied, a third phase of PRA commences and the controller begins to direct incoming data to the remaining un-filled data tracks (e.g., "write 7," "write 8," and "write 9", as shown).

During this third phase of PRA, any one of the even-numbered data tracks can be randomly written. However, writing data write to any of the odd-numbered data track entails caching and re-writing any data in adjacent even data tracks as well. For example, an update to the data track 403 entails (1) reading data tracks 402, 403, and 404 to a temporary cache location; (2) re-writing the data track 403 with one or more updated cells; and (3) subsequently re-writing the data tracks 402 and 404.

One consequence of the illustrated method of prioritized random access is that a size of a non-random data write never exceeds three data tracks (e.g., an odd-numbered data track and the two adjacent even-numbered data tracks). This reduces back-end processing as compared to shingled magnetic recording systems that read and write data in groups of "bands" including several (e.g., 10 or more) data tracks at once to provide for increased areal drive capacity (ADC). Also unlike shingled magnetic recording systems, the illustrated write methodology allows for even-numbered data tracks to be written to at random throughout the life of the drive, and for odd-numbered data tracks to be written to at least some period of time as the magnetic disc 400 is filled with data. Thus, performance of the disclosed system exceeds that of widely available shingled magnetic recording systems. Further, the areal drive capacity achievable via the disclosed system is greater than existing conventional magnetic recording (CMR) and shingled magnetic recording (SMR) systems.

Figure 5:
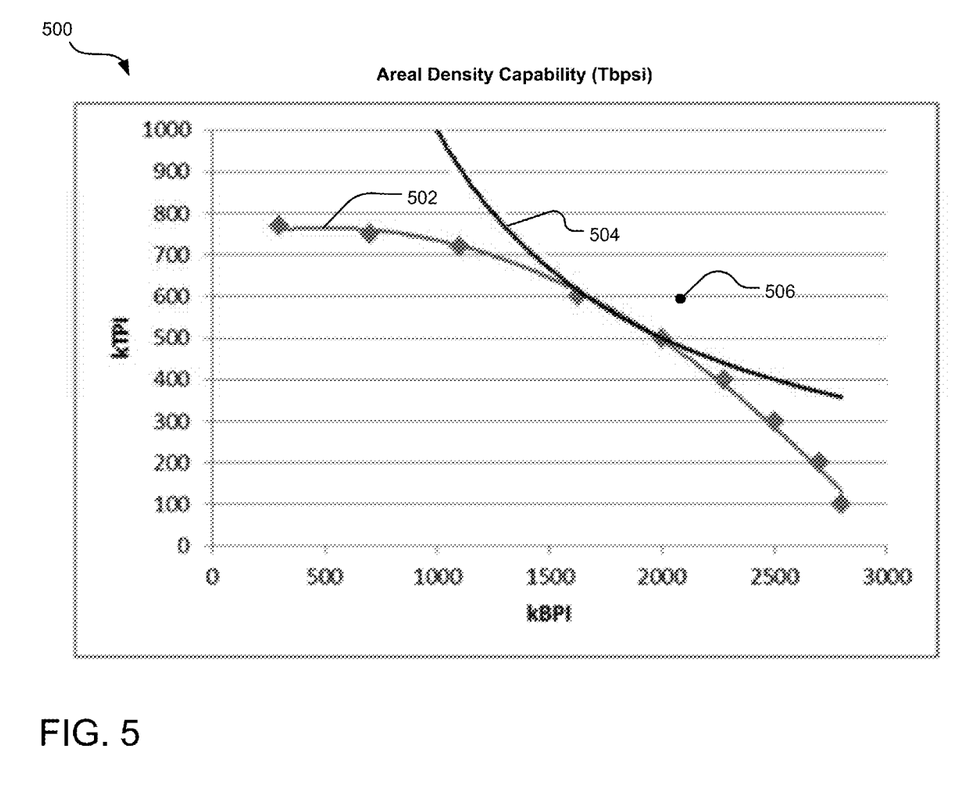
FIG. 5 illustrates an example plot of areal density capability (ADC) achievable for different CMR storage drives.

FIG. 5 illustrates an example plot 500 of areal density capability (ADC) of different CMR storage devices. A first line 502 illustrates a trade-off between track density (ktpi) and linear density (kbpi) for various CMR systems including write elements of similar technical maturity. A second line 504 illustrates a line of constant ADC equal to 1 tbpsi (e.g., the highest observed tbpsi for any CMR system represented via the data of plot 500). Due to write field limitations, perpendicular write heads generally do not write in excess of a threshold, for example, 500 ktpi. Therefore, the upper left portion of the second line 504 may represent a range not practically attainable.

A data point 506 illustrates an ADC of an example dual-writer system implementing the IMR techniques disclosed herein. The example of data point 506 (discussed in detail below) is intended to illustrate a single implementation where ADC of an IMR systems exceeds that of conventional perpendicular recording systems. However, achievable ADC may vary considerably based on select system parameters and design criteria.

By example and not limitation, the data point 506 is discussed below with respect to one example dual-writer IMR system embodying the presently-disclosed technology. In this example system, various interlaced data tracks of different written width are "overlapped" to achieve a constant track pitch across a surface of a magnetic medium (e.g., as shown in FIGS. 3-4). A narrow write pole is used to write even-numbered data tracks having a written track width corresponding to a track density of approximately 600 kbpi. A write pole capable of writing tracks at 600 kbpi is (according to the line 502) capable of producing a linear density as high as 1725 kbpi. Therefore, the narrow write pole may write data on the even-numbered tracks at about 1725 kbpi.

In this example system, a wider write pole is used to write data to odd-numbered data tracks having a written track width that is approximately twice the track width of the written even-numbered data tracks. A write pole capable of writing tracks at 300 ktpi (e.g., twice as wide as a system of 600 ktpi) is, according to the line 502, capable of producing a linear density as high as 2400 kbpi.

According to the above-described parameters, the example dual-writer IMR system may have an average linear density of 2060 kbpi (e.g., (1725+2400)/2) and an effective track density of 600 ktpi, yielding an areal density of about 1.24 tbpsi (e.g., as illustrated by the data point 506). Thus, the example dual-writer IMR system demonstrates a potential 24% gain in effective ADC over the current best available CMR systems.

Figure 6:
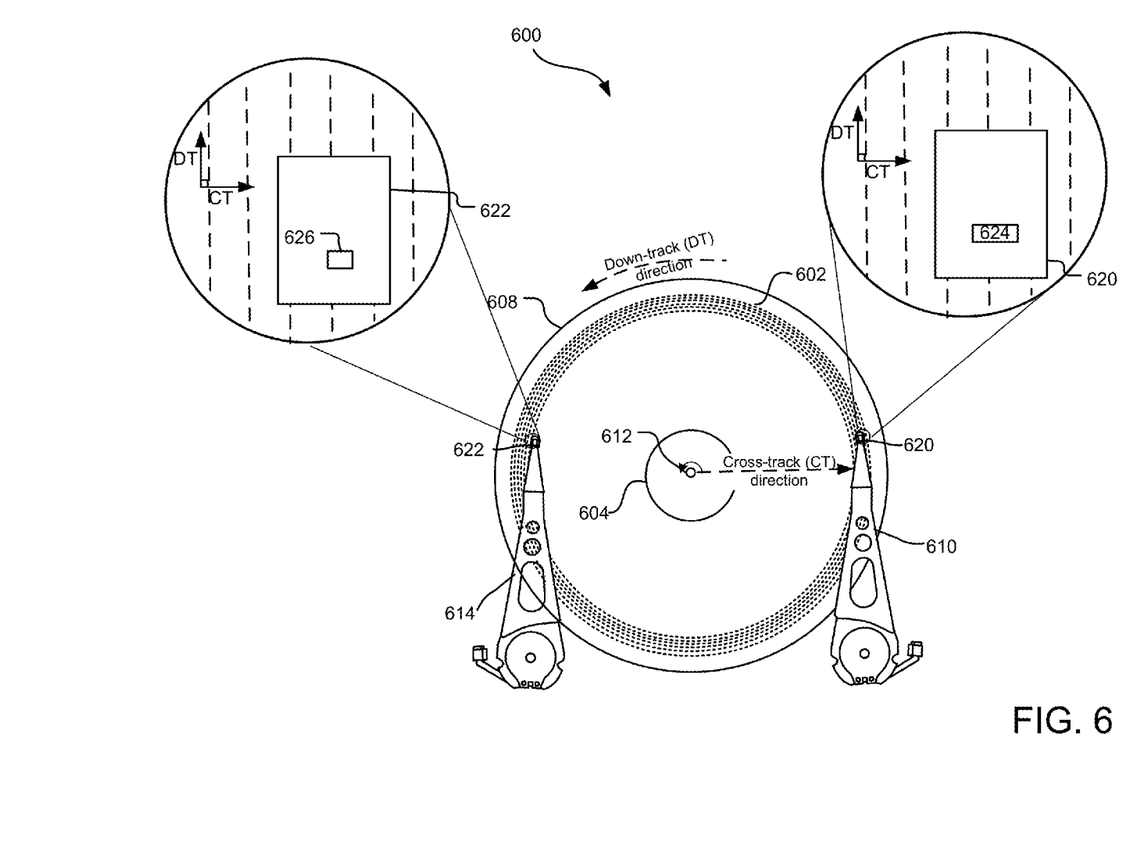
FIG. 6 illustrates another example data storage device for implementing the disclosed technology

FIG. 6 illustrates another example data storage device 600 for implementing the disclosed technology. The data storage device 600 includes a storage medium 608 that rotates about a spindle center or a disc axis of rotation 612 during rotation, and includes an inner diameter 604 and an outer diameter 602 between which are a number of concentric data tracks 610. Information may be written to and read from data bit locations in the data tracks on the storage medium 608.

The data storage device 600 includes two independently-controlled actuator assemblies 610 and 614 that each have at least one transducer head assembly 620 and 622 attached thereto. In FIG. 6, the transducer head assembly 620 includes a first write element 624 configured to write data at a first write width on the storage medium, while the transducer head assembly 622 includes a second write element 626 configured to write data at a second write width.

In one implementation, a controller of the data storage device 600 writes data directed to a first series of alternating data tracks on the storage medium using the first write element 624 and writes data to alternating tracks between the tracks of the first series using the second write element 626.

Figure 7:
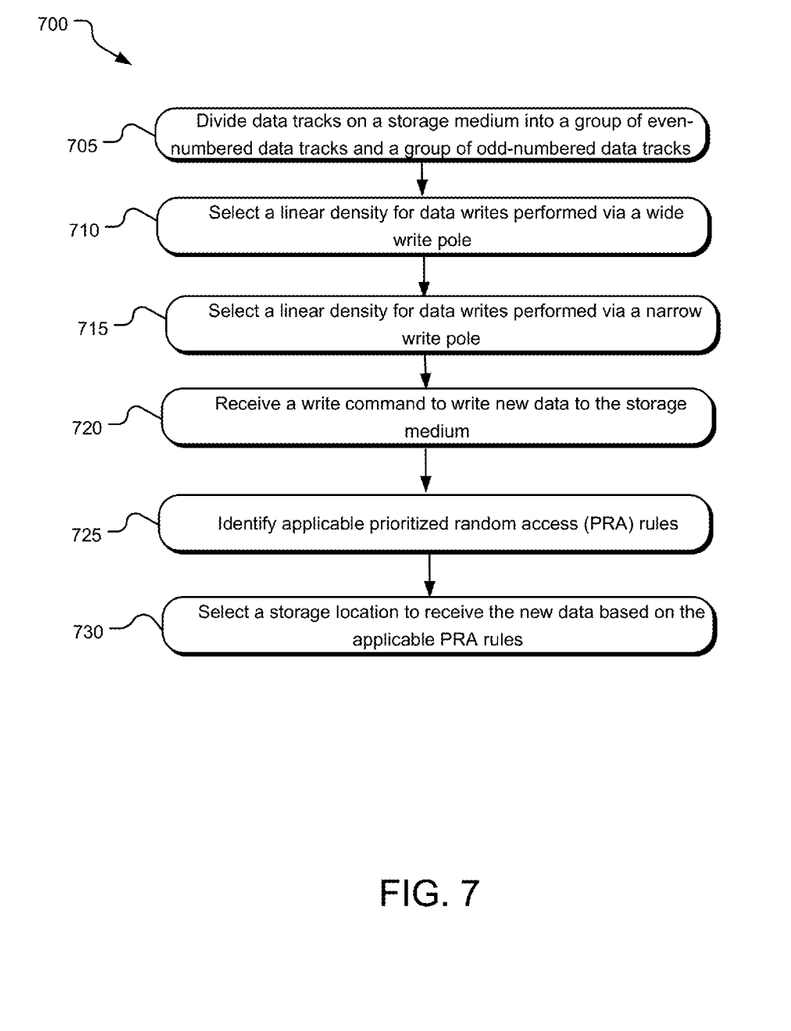
FIG. 7 illustrates example operations for recording data using an interlaced magnetic recording technique.

FIG. 7 illustrates example operations 700 for recording data using an interlaced magnetic recording technique. A dividing operation 705 divides alternating data tracks on a storage medium surface into two different groups. A first of the two groups includes odd-numbered data tracks and a second of the two groups includes even-numbered data tracks.

A selection operation 710 selects a linear density for data written to the storage medium using a first write pole (e.g., a wide write pole). According to one implementation, the determining operation 710 determines a highest possible linear density corresponding to an on-track BER that is at or just below a target threshold (for example, 0.3 decades below the target threshold).

Another selection operation 715 determines a linear density for data written to the storage medium using a second write pole (e.g., a narrow write pole). According to one implementation, the selection operation 715 determines a highest possible linear density for the narrow write pole corresponding to an on-track BER that is at or just below a second set threshold. In one implementation, the ADC of the wide write pole at the selected linear density is higher than a best achievable ADC of the narrow write pole alone.

A receiving operation 720 receives a write command to write new data to the storage medium surface. An identification operation 725 identifies applicable PRA rules, and a selection operation 730 selects a storage location based on the applicable PRA rules.

For example, an applicable PRA rule may mandate that data writes within a radial zone are directed exclusively to odd-numbered data tracks until capacity condition for that radial zone is satisfied (e.g., 50% of the radial zone capacity). If the capacity condition is not satisfied, the new data is written to one or more odd-numbered data tracks using the first (e.g., wide) write pole and the associated linear density. If capacity condition is satisfied, the new data is written to one or more even-numbered data tracks using the second (e.g., narrow) write pole and the associated linear density.

In one implementation, data tracks written by the second write pole have a narrower written width than the data tracks written by the first write pole and are centered such that the track edges slightly overlap and "trim" data from the edges of adjacent, previously-written data tracks generated by the first write pole. Despite this "trimming" effect, each of the wider (underlying) data tracks is still readable because the important information is retained within a center (un-trimmed) portion of the data track.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage device comprising:
 a controller that controls a first write element to write data to a plurality of alternating data tracks on a storage medium and a second write element to write data to at least one data track interlaced with the plurality of alternating data tracks, wherein the first write element is configured to write data at a first write width and the second write element is configured to write data at a second write width less than the first write width.

2. The storage device of claim 1, wherein the controller controls the first write element to write data at a first linear density and controls the second write element to write data at a second linear density less than the first linear density.

3. The storage device of claim 2, wherein the data of the first linear density has a greater track width than the data of the second linear density.

4. The storage device claim 2, wherein the controller is further configured to:
 write data exclusively to alternating data tracks with the first write element until a capacity condition is satisfied.

5. The storage device of claim 4, wherein the controller is further configured to:
 write data with the second write element to a number of data tracks interlaced between the alternating data tracks after the capacity condition is satisfied.

6. The storage device of claim 2, wherein the first write element and the second write element are integrated into two different transducer heads attached to separate actuator arms.

7. A method comprising:
 writing data to a plurality of alternating data tracks on a storage medium surface with a first write element at a first write width; and
 writing data to at least one data track interlaced with the plurality of alternating data tracks on the storage medium surface with a second write element at a second write width less than the first write width.

8. The method of claim 7, further comprising:
writing the data with the first write element at a first linear density; and
writing the data with the second write element at a second linear density less than the first linear density.

9. The method of claim 7, further comprising:
writing data exclusively to the plurality of alternating data tracks with the first write element until a capacity condition is satisfied.

10. The method of claim 9, further comprising:
writing data with the second write element to a number of data tracks interlaced with the alternating data tracks after the capacity condition is satisfied.

11. The method of claim 8, further comprising:
after the capacity condition is satisfied, writing data of the second linear density to a number of data tracks interlaced between the alternating data tracks.

12. The method of claim 7, further comprising:
receiving a command to update data stored in a first data track;
reading a pair of data tracks adjacent to opposite sides of the first data track into a temporary cache;
writing updated data to the first data track with the first write element; and
after writing the updated data to the first data track, writing to the pair of data tracks with the second write element.

13. A storage device controller configured to:
write data with a first write element exclusively to a first plurality of alternating data tracks on a storage medium until a first capacity condition is satisfied; and
after the first capacity condition is satisfied, write data with a second write element to a second plurality of data tracks interlaced with the first plurality of data tracks.

14. The storage device controller of claim 13, wherein the first write element has a first write width and the second write element has a write width less than the first write width.

15. The storage device controller of claim 13, wherein the first write element writes data at a first linear density and the second write element writes data at a second linear density.

16. The storage device controller of claim 13, wherein the storage device controller is further configured to:
receive a command to update data at a first data track of the first plurality of alternating data tracks;
read into a temporary cache data of the first data track and data of a pair of data tracks directly adjacent to the first data track;
write updated data to the first data track; and
after writing the updated data to the first data track, write to the pair of data tracks directly adjacent to the first data track.

17. The storage device controller of claim 13, wherein data writes to the storage medium are all random writes until the capacity condition is satisfied.

* * * * *